United States Patent
Hikabe

(10) Patent No.: US 7,761,639 B2
(45) Date of Patent: Jul. 20, 2010

(54) SLOT INTERFACE ACCESS DEVICE AND SLOT INTERFACE ACCESS METHOD

(75) Inventor: Akinori Hikabe, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 72 days.

(21) Appl. No.: 12/118,977

(22) Filed: May 12, 2008

(65) Prior Publication Data

US 2008/0294827 A1 Nov. 27, 2008

(30) Foreign Application Priority Data

May 21, 2007 (JP) ............................. 2007-133960

(51) Int. Cl.
*G06F 13/36* (2006.01)
*G06F 13/00* (2006.01)
*G06F 13/14* (2006.01)
*G06F 13/38* (2006.01)

(52) U.S. Cl. ........................ 710/300; 710/305
(58) Field of Classification Search ................. 710/300, 710/305
See application file for complete search history.

(56) References Cited

U.S. PATENT DOCUMENTS

| | | | |
|---|---|---|---|
| 6,243,774 B1 * | 6/2001 | Eide et al. | 710/302 |
| 6,427,176 B1 * | 7/2002 | Berglund et al. | 710/8 |
| 6,782,464 B2 * | 8/2004 | Blackmore et al. | 711/202 |
| 6,928,503 B1 * | 8/2005 | Mosgrove | 710/302 |
| 7,146,497 B2 * | 12/2006 | Almeida et al. | 713/100 |
| 7,363,404 B2 * | 4/2008 | Boyd et al. | 710/104 |
| 7,516,252 B2 * | 4/2009 | Krithivas | 710/37 |
| 2003/0037185 A1 * | 2/2003 | Davis et al. | 710/1 |
| 2004/0085965 A1 | 5/2004 | Fotedar | |
| 2007/0094427 A1 * | 4/2007 | Chan et al. | 710/104 |
| 2008/0147937 A1 * | 6/2008 | Freimuth et al. | 710/104 |

FOREIGN PATENT DOCUMENTS

| | | |
|---|---|---|
| JP | 10-041956 | 2/1998 |
| JP | 11-178024 | 7/1999 |
| JP | 2000-324156 | 11/2000 |
| JP | 2001-358736 | 12/2001 |
| JP | 2003 345407 | 12/2003 |
| JP | 2005-268954 | 9/2005 |

OTHER PUBLICATIONS

English Translation of JP2001-358736; Dec. 26, 2001.*
European Patent Office issued an European Search Report dated Nov. 17, 2008, Application No. 08156182.1.

* cited by examiner

*Primary Examiner*—Ryan M Stiglic
(74) *Attorney, Agent, or Firm*—Young & Thompson

(57) ABSTRACT

A slot interface access device including a slot management module; a slot control module; and a physical slot to management slot contrast table, the slot management module, the slot control module, and the physical slot to management slot contrast table being provided between an input and output control module and a slot interface lower than the input and output control module. The input and output control module accesses the slot interface using virtual slot identification information. The slot management module converts the virtual slot identification information into physical slot identification information while referring to the physical slot to management slot contrast table, and accesses the slot control module corresponding to the physical slot identification information, thereby realizing a physical access of the input and output control module to the slot interface. The slot interface access device is higher in CPU capability than other devices each including the slot interface.

8 Claims, 15 Drawing Sheets

FIG.8

| PHYSICAL SLOT | VIRTUAL SLOT |
|---|---|
| SYSTEM 1, SLOT 1 | SLOT 1 |
| SYSTEM 1, SLOT 2 | SLOT 2 |
| SYSTEM 2, SLOT 1 | SLOT 3 |
| SYSTEM 3, SLOT 1 | SLOT 4 |
| SYSTEM 3, SLOT 2 | SLOT 5 |
| | |

SLOT INTERFACE ACCESS DEVICE AND SLOT INTERFACE ACCESS METHOD

RELATED APPLICATIONS

This application is based upon and claims the benefit of priority from Japanese patent application No. 2007-133960, filed on May 21, 2007, the disclosure of which is incorporated herein in its entirety by reference.

BACKGROUND OF THE INVENTION

1. Field of the Invention

The present invention relates to a slot interface access device and a slot interface access device assembly for accessing slot interfaces present to be distributed in a plurality of main devices, and a method and a program therefor.

2. Description of the Related Art

There is conventionally known a technique for connecting main devices to one another by a network and for allowing each of the main devices to use functions of the other main devices as disclosed in, for example, Japanese Patent Application Laid-Open No. 2001-358736. The "main device" means herein a device that includes an interface for accommodating a terminal (e.g., a button telephone), an interface connecting the main device to a public line, and an interface connecting the main device to an IP network.

However, to enable the main devices to mutually use functions of the others via the network, it is necessary to alternate their functions, respectively. The non-alternated functions are not compliant with the network, so that the other main devices are incapable of using all functions of a certain main device via the network.

Namely, with the conventional technique, in the architecture of networking connection among the main devices, CPUs of the main devices manage resources, respectively and manage states of terminals, lines and the like separately. Due to this, to enable each of the main devices to actuate the functions of the other main devices via the network is not so simple as actuating its own functions but it is disadvantageously necessary to alter the functions so as to be compliant with the network.

Furthermore, in case of conventional networking systems, the systems manage slots for packages that are resources of each main device separately. Due to this, each system is unable to know information, states, and the like of resources of the other systems. As a result, restrictions are imposed on use of functions of the other main devices on the network.

An object of a reference embodiment to be described below is to construct a networking system architecture that can facilitate managing information and that is free from restrictions to functions by allowing one main device to integrally manage information such as resources of hardware of all main devices connected to one another by a network.

The gist of the reference embodiment lies in a technique for allowing each main device to handle resources on the network as if they are its own resources.

In the main device operating under program control, hardware resource management, that is, management of terminals, lines and the like is made in the form of package management.

Therefore, to allow each main device to handle resources on the network as if they are its own resources, it suffices that the main device handles packages on the network as if they are its own packages.

FIG. 1 is a conceptual diagram of package management on the network.

If a package is installed into a main device 2, information on the package and information on a terminal, a line and the like connected to the package are transmitted to a main device 1 via the Ethernet (registered trademark).

On the main device 2 side, since these pieces of information are not at all transmitted to a package control unit or a call control unit of the main device 2, it does not appear to the main device 2 that a situation changes.

On the main device 1 side, since a lower layer processes data transmitted from the main device 2 and it appears as if the information arrives from a slot of the main device 1, it appears to the main device 1 that the package is input to the slot of the main device 1.

Furthermore, as for a command to the package (downstream data), a lower layer of the main device 1 processes the downstream data and transmits a command to a virtual package to a real package on the network.

By introducing this mechanism, it is possible for each main device to handle resources on the network as if they are its own resources.

Therefore, a higher layer of each main device such as the call control unit can freely use resources without knowledge that the resources are present on the network.

FIG. 2 is a configuration diagram of the networking system architecture according to the reference embodiment.

A main device managing all the resources on the network and exerting all call controls is referred to as "master".

A main device connected to the master, providing package information to the master, and obeying commands from the master is referred to as "slave".

To establish the networking system architecture according to the reference embodiment, it is necessary that one of a plurality of main devices constituting the network acts as a master. All slaves are connected to the master, obey commands from the master, and do not perform any processings such as call control. Namely, even if a slave includes a functional unit performing call control or the like, the unit is in a dormant state.

The master can control a plurality of slaves and can handle resources of the main devices connected to the master as slaves as if they are all its own resources.

The networking system architecture constituted by the master and the slaves can thereby act as if it is one system.

It is necessary to set, in advance, information as to which main device acts as a master or a slave and information as to by which IP address each of the main devices is connected to the master.

The main device set as the master awaits connection from the slaves and each of the slaves establishes connection to a preset IP address of the mater.

In this way, after the connection between the master and the slaves is established, transmission of package information and the like are performed and the networking system architecture operates as one system.

If the master goes down, all the main devices connected to the master become unavailable. To prevent this problem, if the master goes down, one of a plurality of slaves acts as a master to execute roles of the master for the original master (Redundancy Function).

It is necessary to set, in advance, information as to which slave substitutes for the master if the master goes down.

A specific method for central control over resources on the network will next be described.

FIG. 3 shows a system configuration on the networking system architecture.

Only one master is present on the network and controls all slaves.

To identify each main device (system) on the network, the systems are given unique system IDs, respectively.

FIG. 4 is a conceptual diagram of slot management according to the reference embodiment.

Packages are physically installed into slots of each of the systems connected to the network and having the systems ID, respectively. Information on the packages is unitarily integrated into a virtual slot database and the master (system) manages the virtual slot database.

The master controls slots while referring to this virtual slot database.

If slots belong to the system other than the master, the slots are present physically at a remote location connected to the master by an IP network. However, the master can handle the slots as if they are its own slots without knowledge that the physical slots are at remote locations.

Therefore, the master can handle terminals and lines connected to the packages installed into the slots as if they are terminals and lines connected to the master.

FIG. 5 shows the systems representing the above-stated manners.

Packages connecting terminals, packages accommodating therein lines connected to a public line, and packages accommodating therein IP lines connected to the IP network are installed into a system having system ID: 1, a system having system ID: 2, and a system having system ID: 3, respectively.

Since physical slots of these systems are managed as virtual slots in the virtual slot database, each of the systems can freely control the terminals, lines and the like accommodated in the packages connected to the slots as if they are its own terminals, lines and the like.

By adopting the resource management method, even the systems distributed on the network can use functions of the other systems without restrictions.

As shown in FIG. 3, the systems shown in FIG. 5 are built on a client-server architecture in which one master controls slaves. The master performs call processings on all the main devices including the master and manages a database. The master also manages virtual slots.

The systems are connected to one another according to an internet protocol (IP) and given system IDs unique to the systems, respectively.

The systems 1, 2, and 3 include packages accommodating therein terminals, packages accommodating therein ordinary lines, and packages accommodating therein IP lines, respectively.

The virtual slot database manages information on these packages. While the master basically manages the data, each of the slaves holds the same data in case of replacement of the master.

The example shown in FIG. 5 will be additionally described from viewpoints of data flow.

FIG. 6 shows data flow for conventional package control.

As shown in FIG. 6, upstream data from a package is transmitted from a slot I/F module 101 to a CAPS (call control module)/OPMS (package and terminal management module) 105 via an IOCS (input/output control module) 103.

The CAPS/OPMS 105 processes the upstream data and transmits a downstream command to the slot I/F module 101 via the IOCS 103. For example, if a package is installed into a slot, then data is transmitted to the CAPS/OMPS 105 as upstream data, and the CAPS/OMPS 105 recognizes package installation and exercises a starting control over the package, i.e., permits the package to be active. If a terminal connected to the package installed into the slot is off the hook, the slot I/F module 101 transmits data indicating that the terminal is off the hook to the CAPS/OPMS 105 as upstream data. In response to the upstream data, the CAPS/OPMS 105 transmits a command to produce a dial tone from the terminal to the slot I/F 101 via the IOCS 103 as downstream data.

In FIG. 6, the data from the slot I/F 101 is directly transmitted to the higher module as input data, so that the system concerned can naturally control only the slot connected to the system.

FIG. 7 shows data flow according to the reference embodiment.

As shown in FIG. 7, in the reference embodiment, slot management by networking is realized by additionally providing slot control modules 107 each controlling slot input/output and a slot management module 109 managing slot information.

Upstream data from one slot is subjected to a temporary spooling by one of the slot control modules 107 corresponding to a system including the slot and then transmitted to the slot management module 109 of the master controlling the system. If the system is the master, the upstream data is transmitted to its own slot management module 109. The slot management module 109 exercises such a control that it appears to the IOCS 103 that is a higher module that the data transmitted to the slot management module 109 is transmitted from a certain slot.

Operation performed by the slot management module 109 will be described in more detail with reference to a table of FIG. 8.

If the slot management module 109 receives data from a specific slot of a certain system and the specific slot is a slot of the system that has not been recognized so far, the slot management module 109 newly assigns a virtual slot number to the slot and subsequently regards the slot of the system as the slot to which the virtual slot number is assigned.

For example, if data is transmitted from a slot 1 of a system 1 and the slot 1 is the slot that has not been recognized so far, a virtual slot number 1 is assigned to the slot 1.

In this manner, if virtual slot numbers are newly assigned to slots so as to act as virtual slots, respectively, a physical slot/virtual slot contrast table 111 as shown in FIG. 8 is created.

Thereafter, the higher module such as the IOCS 103 or the CAPS/OPMS 105 regards the data transmitted from the slot 1 of the system 1 as data from its own slot 1 even without knowledge of the network.

If downstream data is to be actually transmitted to a slot to issue a command to hardware, the command is issued to a slot of an appropriate system while referring to the physical slot/virtual slot contrast table 111.

The command is transmitted to the slot control modules 107 of the systems and commands are transmitted to actual packages of the systems, respectively.

In this manner, by introducing the modules 107 and 109 controlling or managing slots on the network, there is no need to have knowledge of the network during most parts of the processings performed by the systems (main devices) and it is possible to control hardware as if the module controls the system corresponding to the module.

Differently from hardware limitation on the number of physical slots, no limitation is set to the number of virtual slots but an unlimited number of virtual slots can be assigned as long as a memory of each system can afford.

Generally, in each of the systems, processings are performed using virtual slot numbers. However, in parts visible to a user, such as setting of system data, it is often desired to perform a processing while identifying by which slot in which system the processing is performed.

In that case, settings and the like can be made using physical slots while referring to the physical slot/virtual slot contrast table 111.

The reference embodiment solves many of the conventional problems by attaining the central control networking system architecture so as to avoid problems with a distributed networking system architecture.

Namely, by contriving the resource central control networking system architecture, information can be easily managed and the networking system architecture without restrictions to functions can be realized. However, because of concentration of processings on one main device, heavy burden is cast on the CPU of the main device to disadvantageously make it impossible to control many resources. In other words, one master main device controls all the systems on the network, disadvantageously resulting in concentration of considerable load on the master main device.

SUMMARY OF THE INVENTION

It is, therefore, an object of the present invention to realize a networking system architecture using CPUs on personal computers (hereinafter, "PCs") having high performances, to reduce the load on a master main device having heavy traffic, and to improve affinity to an external application.

According to a first aspect of the present invention, there is provided a slot interface access device comprising: a slot management module; a slot control module; and a physical slot to management slot contrast table, wherein the slot management module, the slot control module, and the physical slot to management slot contrast table are provided between an input and output control module and a slot interface lower than the input and output control module, the input and output control module accesses the slot interface using virtual slot identification information, the slot management module converts the virtual slot identification information into physical slot identification information while referring to the physical slot to management slot contrast table, and accesses the slot control module corresponding to the physical slot identification information, thereby realizing a physical access of the input and output control module to the slot interface, and the slot interface access device is higher in CPU capability than other devices each including the slot interface.

In the slot interface access device, the slot interface access device may be configured not to comprise the slot interface.

According to a second aspect of the present invention, there is provided a slot interface access device assembly comprising: the slot interface access device according to the first aspect of the present invention; and a slot interface access device acting as a substitute for the slot interface access device according to the first aspect of the present invention if the slot interface access device according to the first aspect of the present invention malfunctions, and having a higher CPU capability than CPU capabilities of the other devices.

By applying the present invention, a system including a high performance CPU can be used to act as a master main device and a larger-scale networking system architecture can be constructed.

Furthermore, since software of the main devices can run on the PC, affinity of the PC to the main devices is improved, thereby facilitating application coordination, e.g., CTI (Computer Telephony Integration).

BRIEF DESCRIPTION OF THE DRAWINGS

FIG. 8 shows a specific example of a physical slot/virtual slot contrast table according to the reference embodiment;

DETAILED DESCRIPTION OF THE INVENTION

An embodiment of the present invention will be described hereinafter in detail with reference to the accompanying drawings.

In the embodiment of the present invention, not a switchboard but a high performance general-purpose PC is used as a system that acts as a master main device, thereby avoiding the conventional problems. Namely, a similar program to the switchboard is allowed to be executed on the PC and a plurality of main devices is connected to the PC by an IP network. The PC acting as the master main device controls hardware of the main devices connected to the PC as slave main devices.

By so configuring, a high performance CPU included in the PC can be used, so that the PC can handle heavy traffic from the slave main devices.

Figure 1:
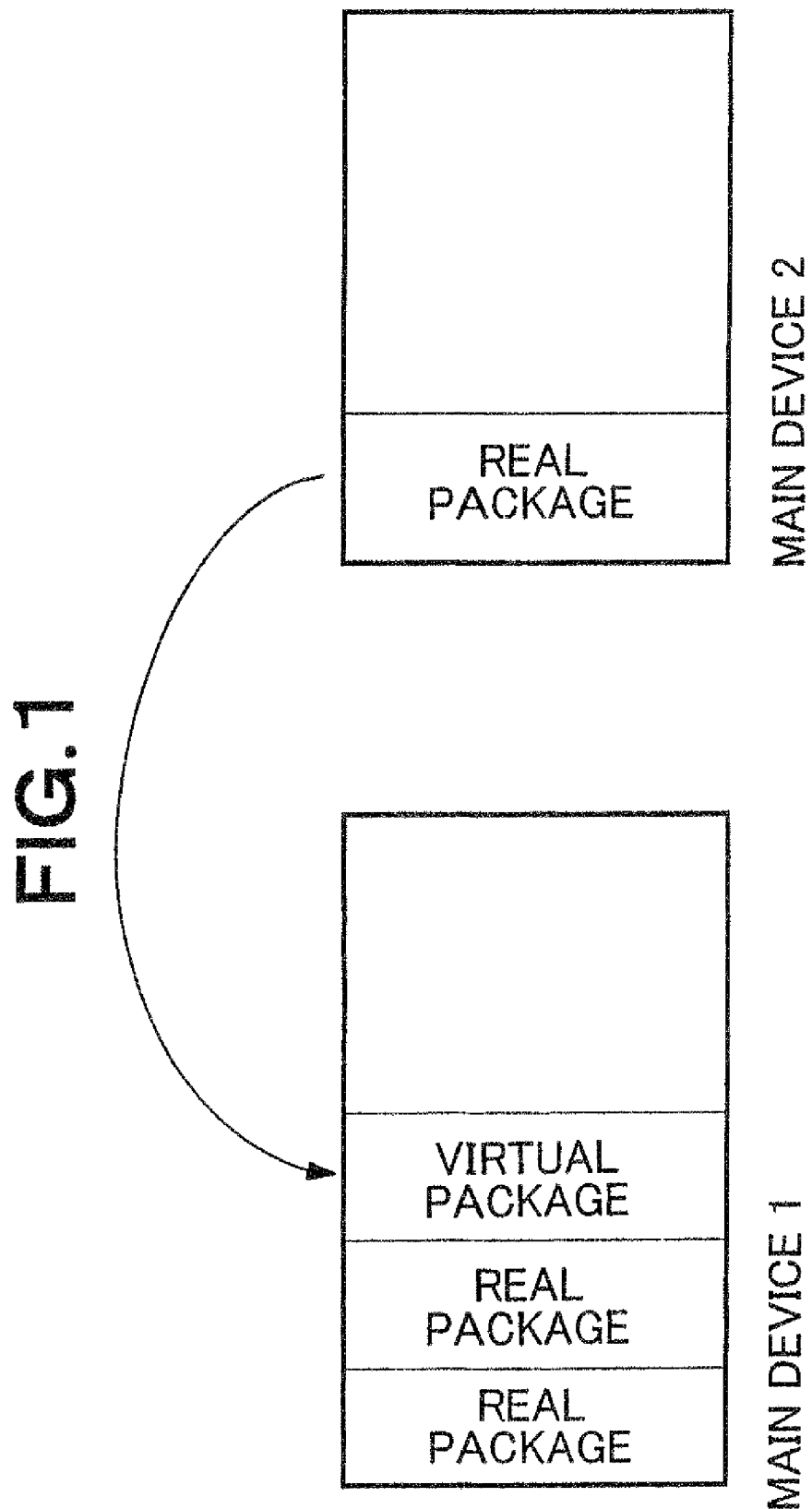
FIG. 1 is a conceptual diagram showing a manner in which one main device handles a real package of the other main device as a real package of one main device using a virtual package according to a reference embodiment.
Figure 2:
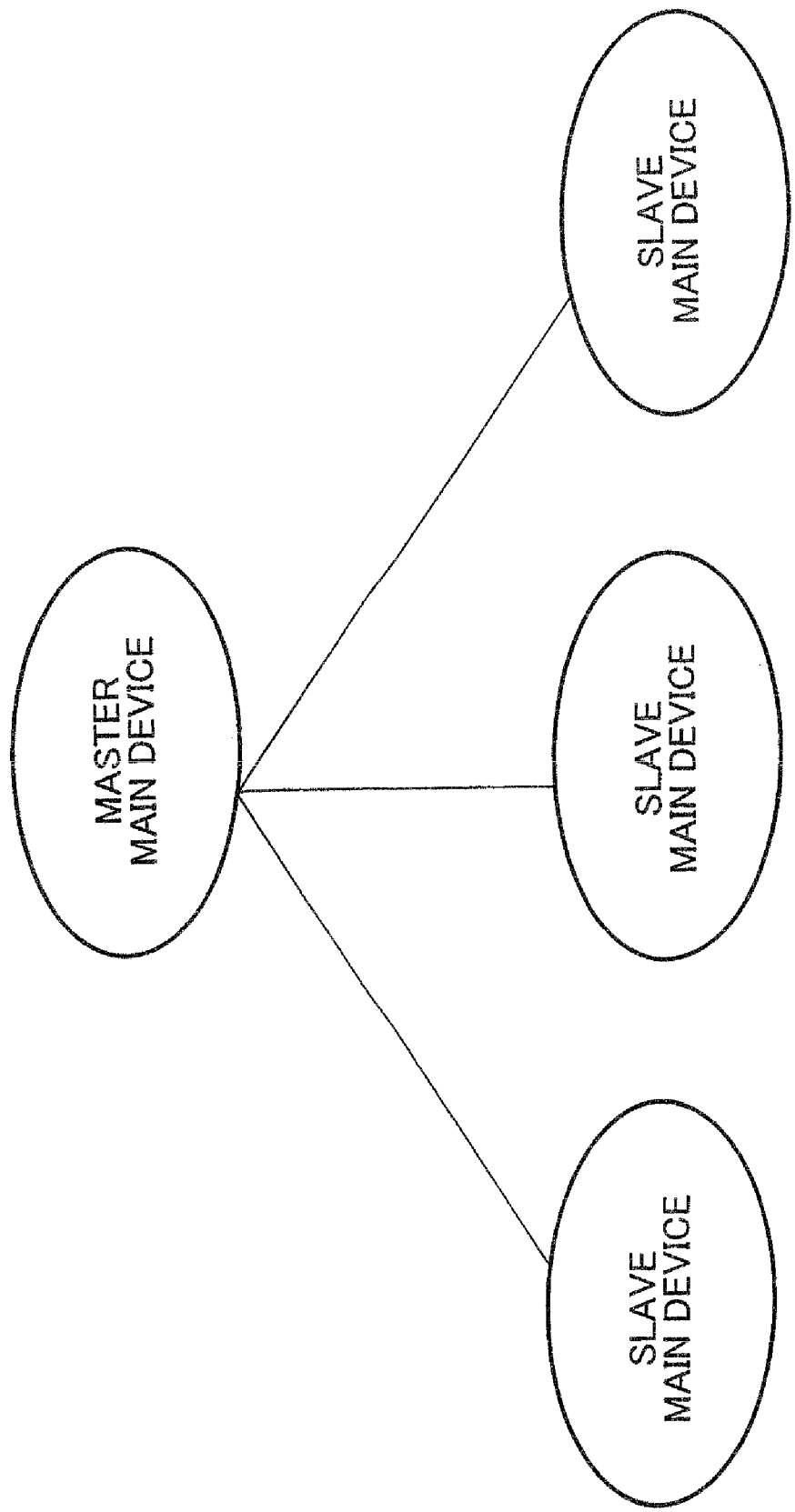
FIG. 2 is a conceptual diagram showing an example of connection among a master main device and slave main devices according to the reference embodiment.
Figure 3:
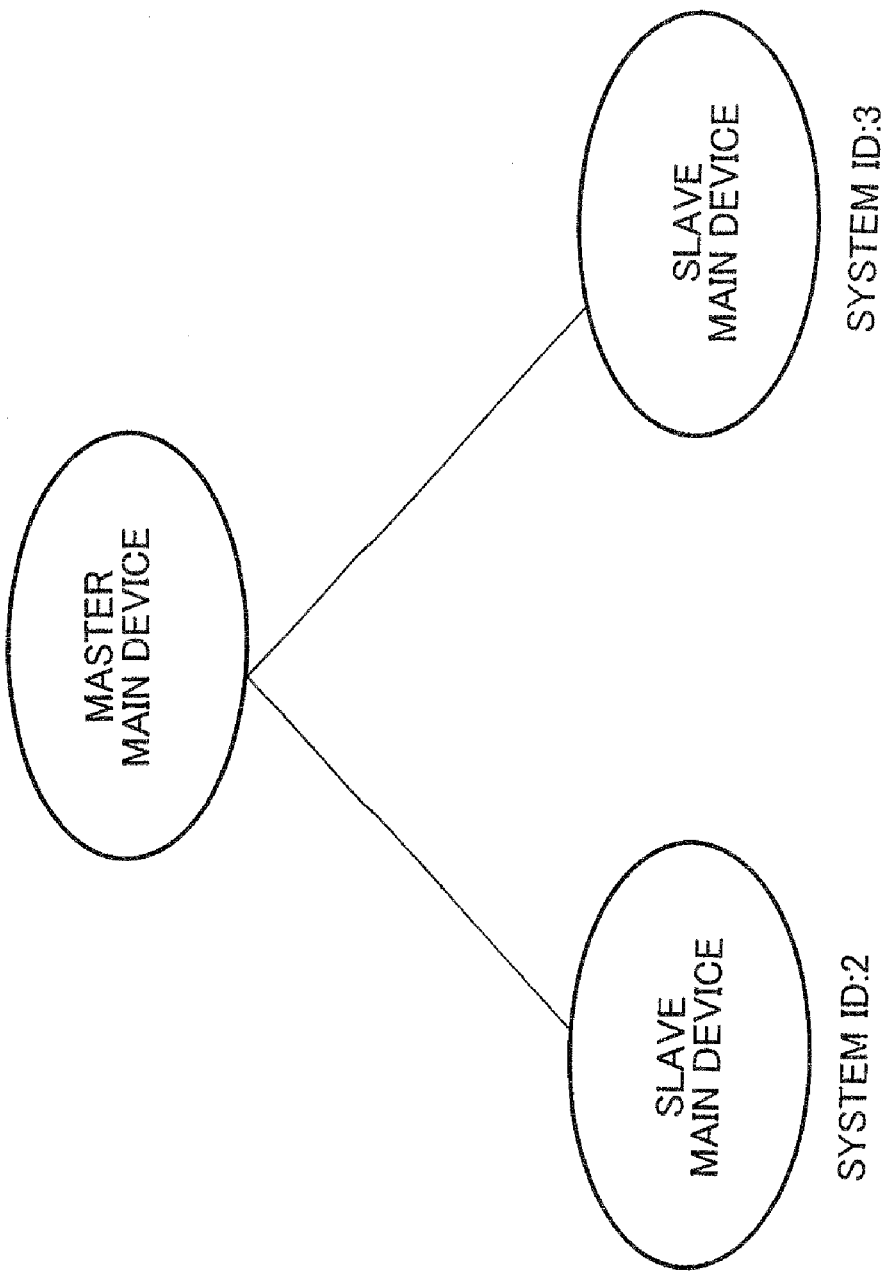
FIG. 3 is a conceptual diagram showing another example of connection among the master main device and the slave main devices according to the reference embodiment.
Figure 4:
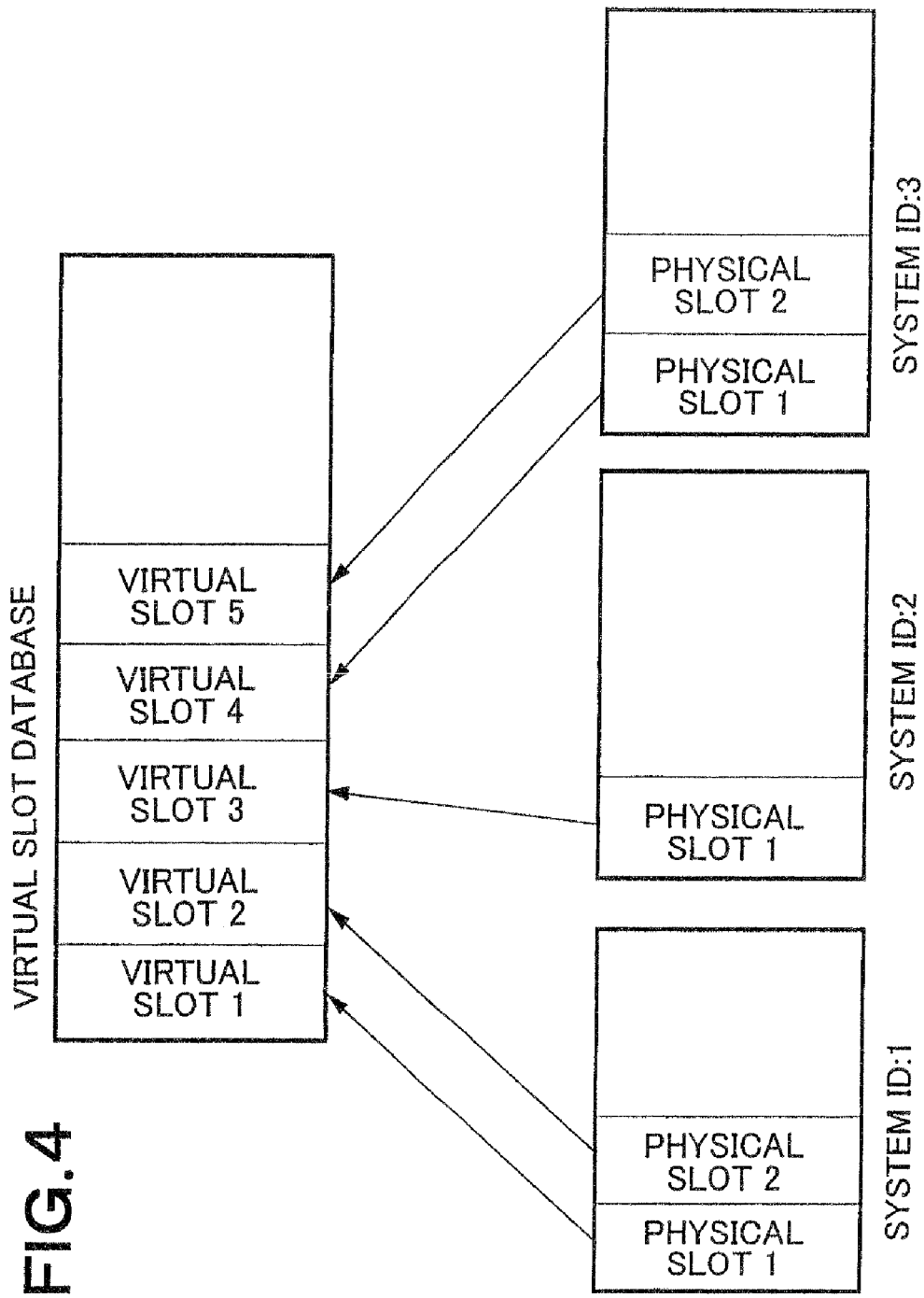
FIG. 4 is a conceptual diagram showing correspondence between virtual slots and physical slots according to the reference embodiment.
Figure 5:
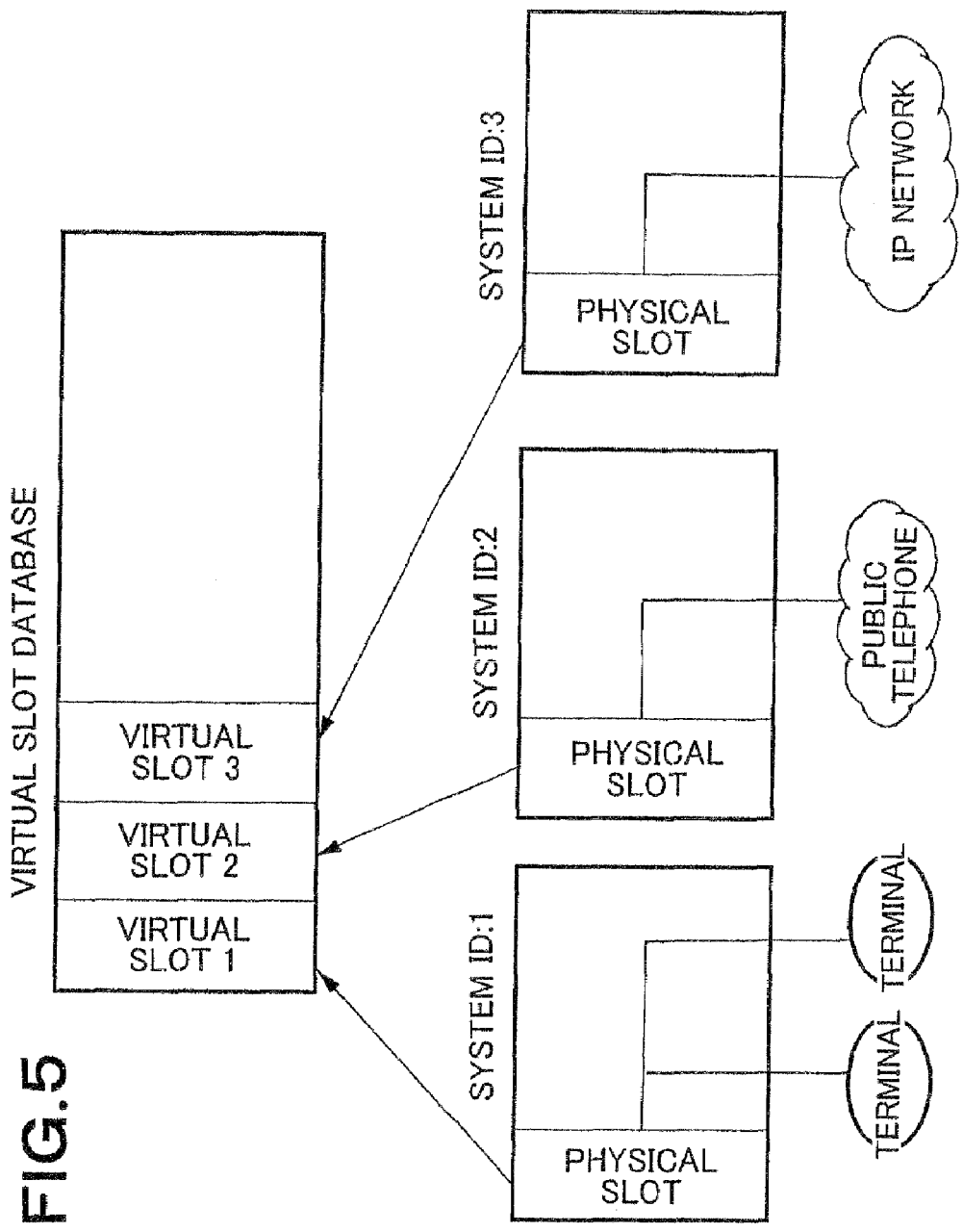
FIG. 5 is a schematic diagram showing correspondence between the virtual slots and the physical slots and showing an example of connection destinations of the respective physical slots according to the reference embodiment.
Figure 6:
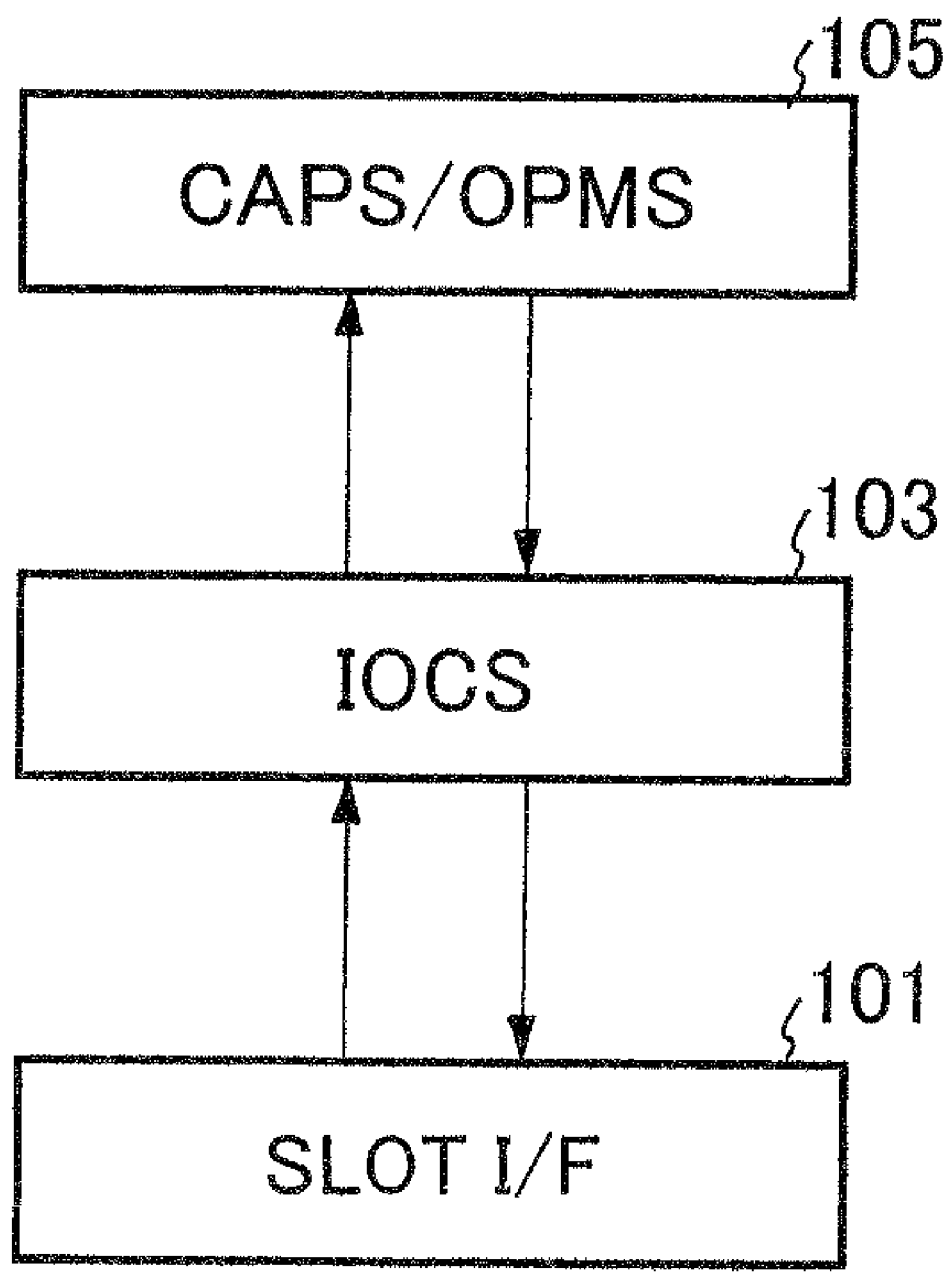
FIG. 6 is a schematic diagram showing a connection relation among CAPS/OPMS, IOCS, and a slot interface according to a conventional example.
Figure 7:
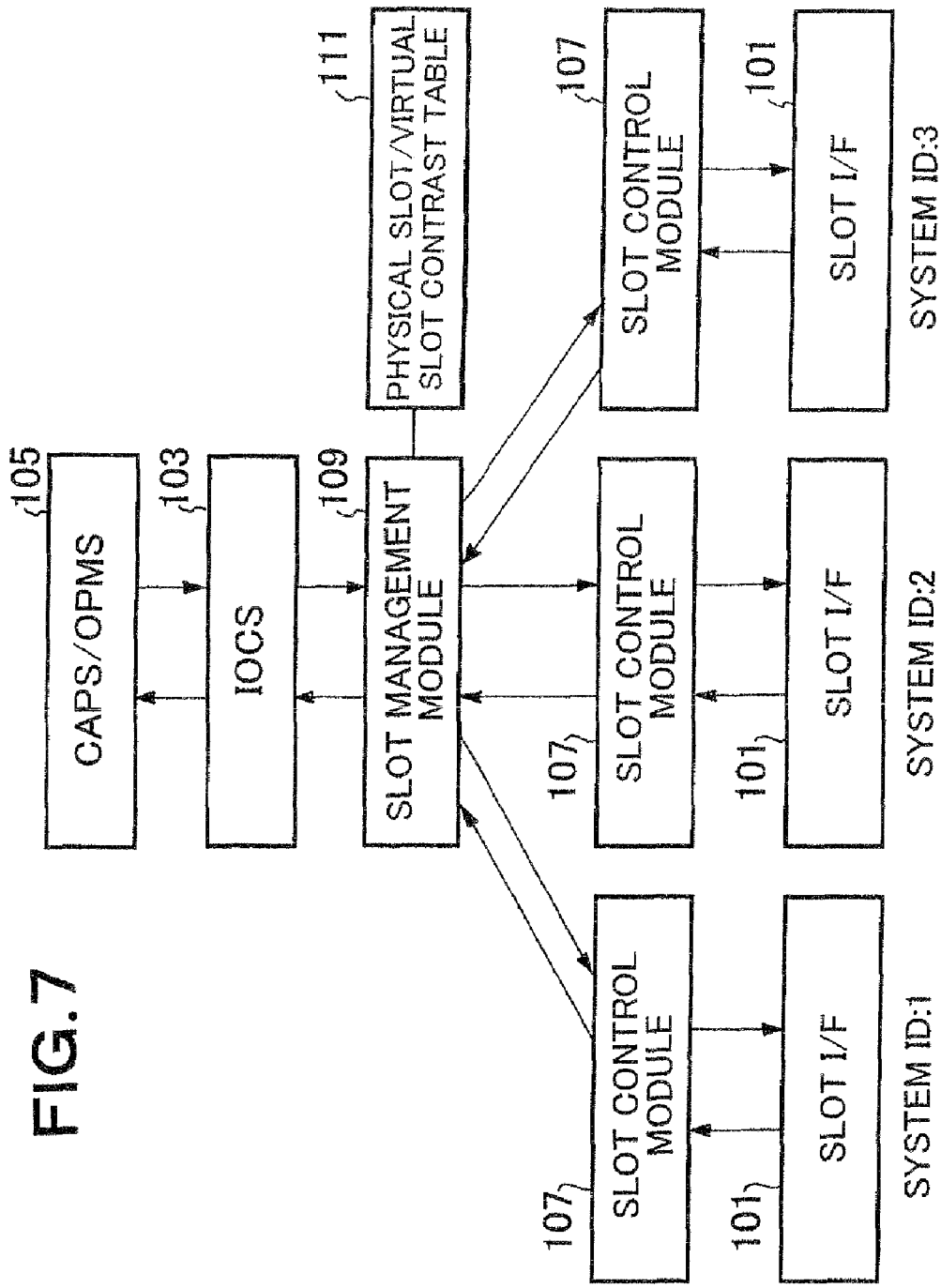
FIG. 7 is a schematic diagram showing a connection relation among the CAPS/OPMS, the IOCS, a slot management module, a physical slot/virtual slot contrast table, slot control modules, and the slot interface according to the reference embodiment.
Figure 9:
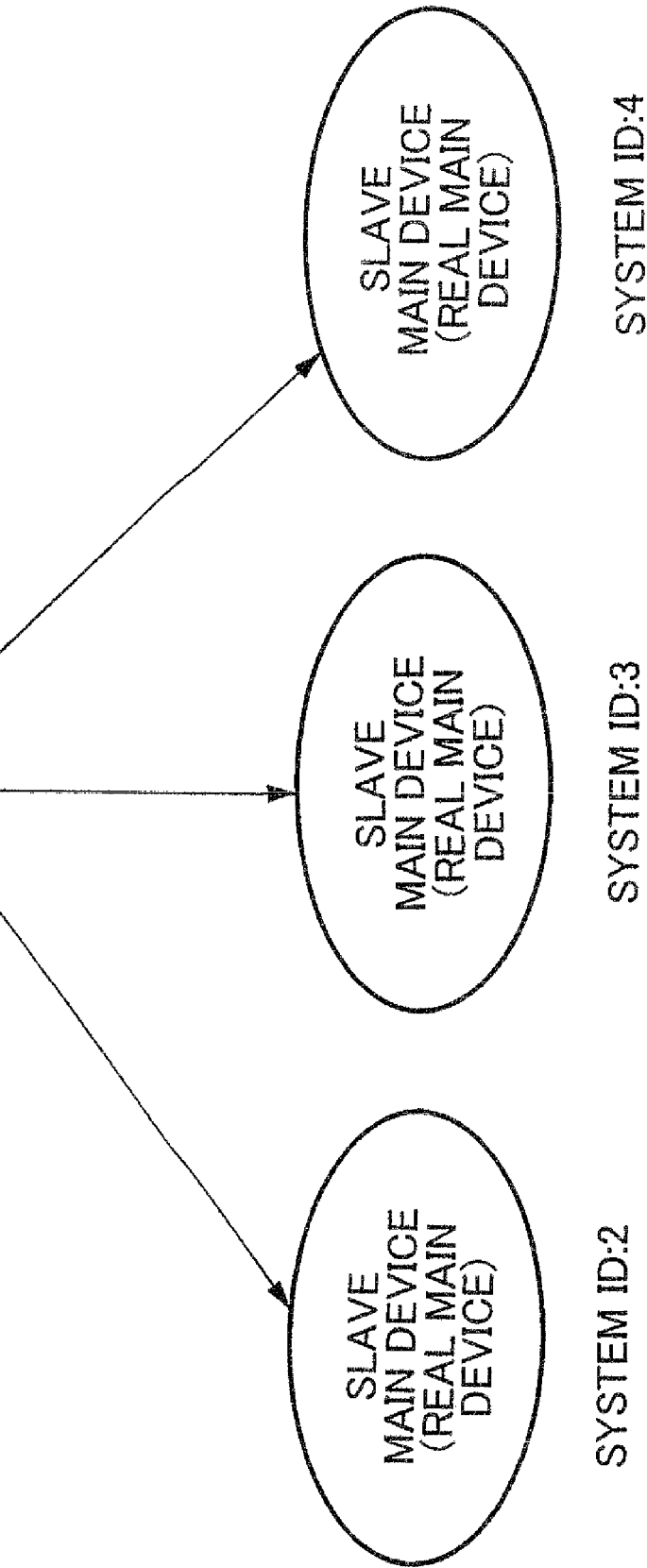
FIG. 9 is a conceptual diagram showing of a resource central control networking system architecture in which a PC acts as a master main device according to an embodiment of the present invention.

FIG. 9 is a conceptual diagram of a resource central control networking system architecture in which the PC acts as the master main device.

FIG. 9 represents that the PC acts as the master main device and controls real main devices acting as slave main devices.

In this case, the PC is naturally incapable of directly controlling hardware of a switchboard, so that the slave main devise connected to the switchboard control the hardware, respectively.

This control will be described with reference to FIG. 10.

Figure 10:
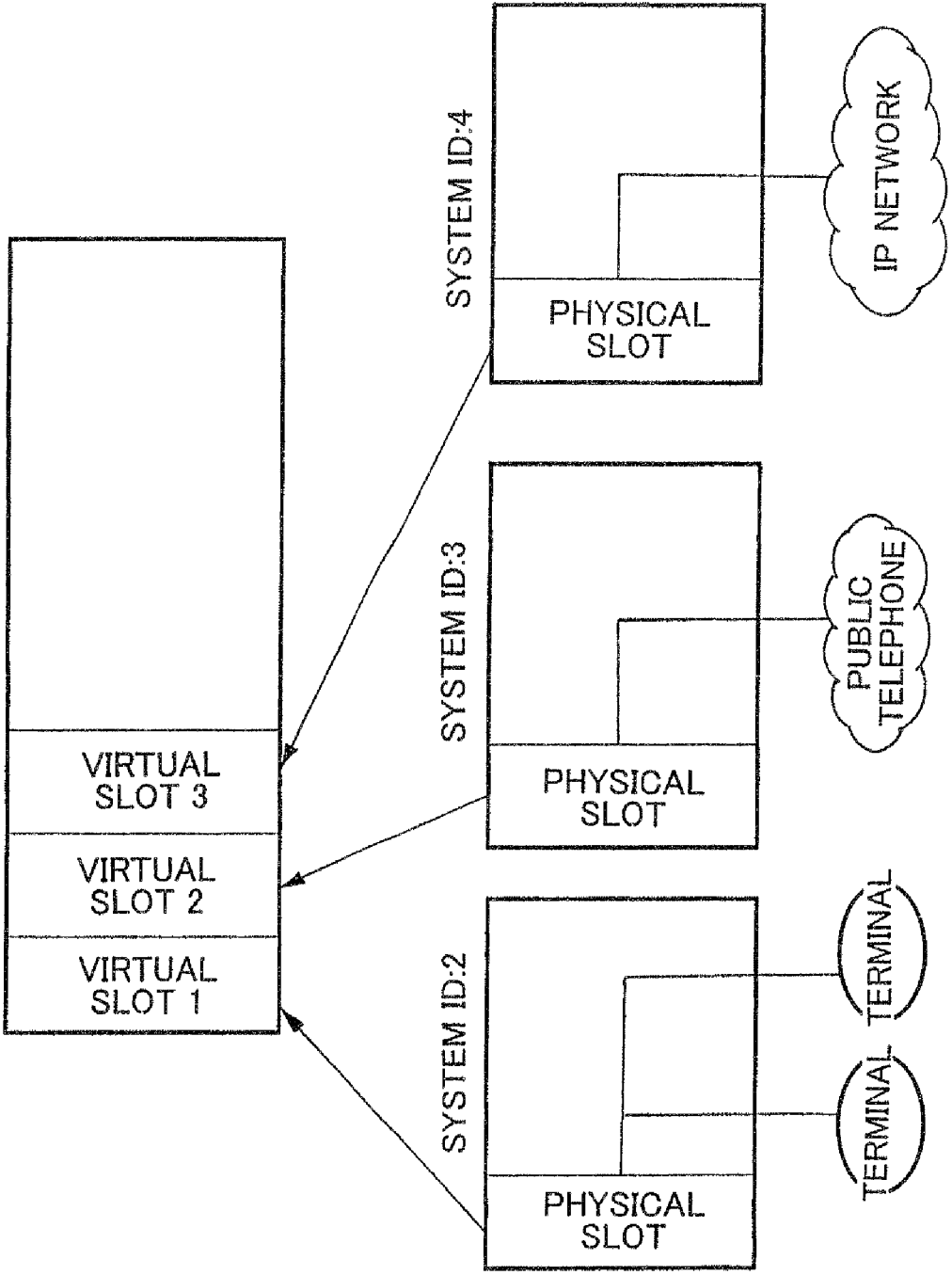
FIG. 10 is a schematic diagram showing a package management method according to the embodiment of the present invention.

A package management method shown in FIG. 10 is an applied method of that according to the reference embodiment.

Packages that are real hardware are installed into the slave main devise identified by system IDs: 2, 3, and 4, respectively. The slave main devices are also referred to as "systems 2, 3, and 4", respectively, hereinafter. All information on the packages is transmitted to and managed by the master main device identified by system ID 1. The master main device is also referred to as "system 1", hereinafter.

Furthermore, information on terminals, lines and the like connected to the respective packages is all transmitted to the master main device as upstream data.

By doing so, it appears to the master main device as if the packages are installed into slots of the master main device although the master main device is incapable of accommodating therein packages.

Moreover, a command to a real package is transferred to each of the packages of the systems 2, 3, and 4 so as to control the terminals, the lines and the like connected to the systems 2, 3, and 4, respectively.

By doing so, even the general-purpose PC that cannot directly control the packages can control the switchboard. Besides, since the high performance CPU of the PC can be used, it is possible to handle heavy traffic even if many slave main devices are connected to the PC.

It is thereby possible to relax problems with the conventional resource central control networking system architecture and construct a larger-scale networking system architecture.

Moreover, the resource central control networking system architecture introduces a mechanism for selecting a substitute master main device so as to continue operation if the master main device goes down or communication breaks down for some reason.

In a mechanism shown in FIG. 9, if the PC acting as the master main device goes down, one of the main devices that is connected to the PC as the slave main device and that has a highest master main device priority is selected from among those connected to the PC as the slave main devices since the PC is not connected to the network. As a result, the node having low CPU capability acts as a new or substitute master main device.

To prevent this situation, the resource central control networking system architecture according to the embodiment introduces a mechanism for putting a PC acting as a substitute mater main device on standby as a backup PC and for causing the backup PC to operate during occurrence of a failure.

Figure 11:
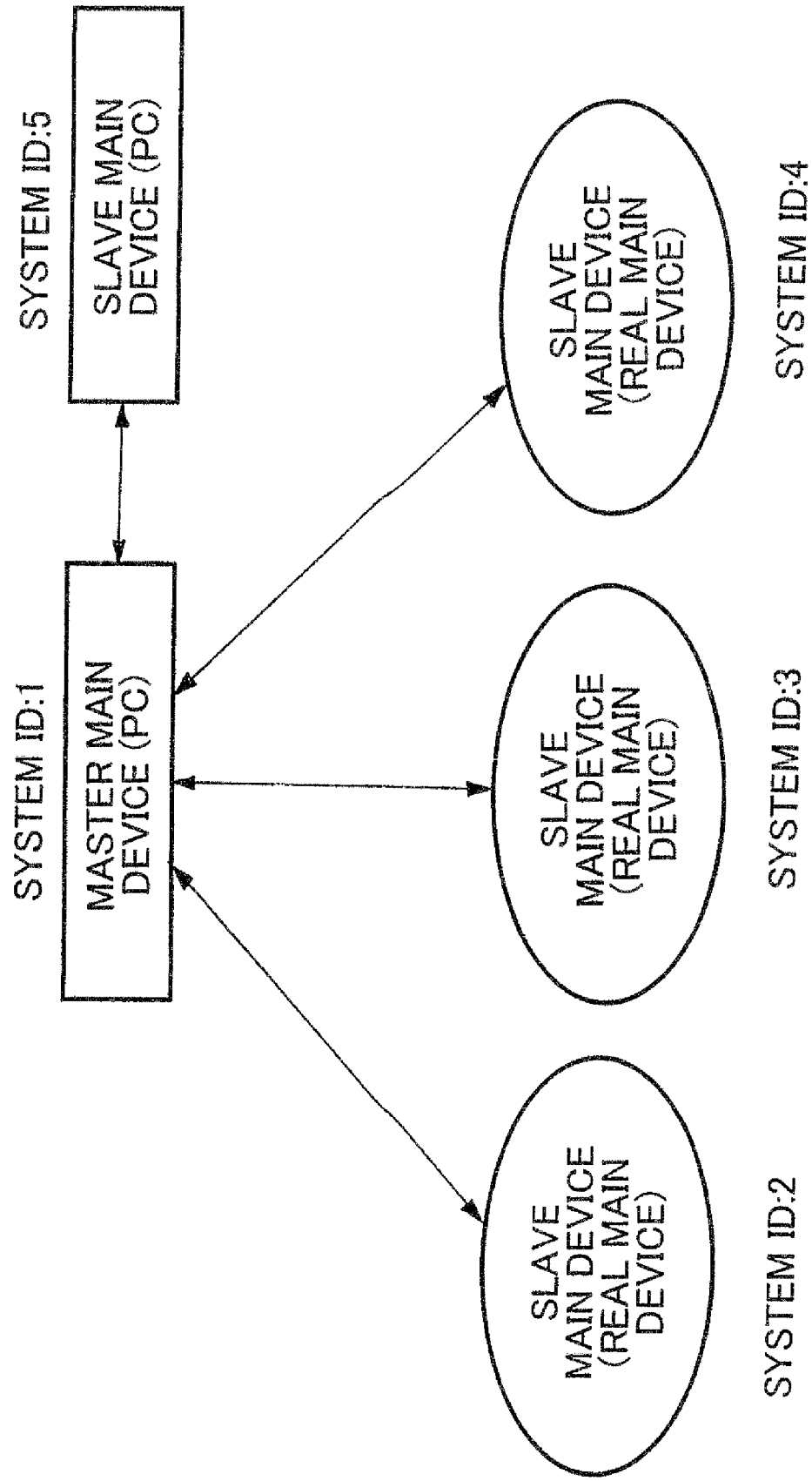
FIG. 11 is a conceptual diagram showing the resource central control networking system architecture in which a first PC acts as a master main device and in which a second PC acts as a substitute master main device according to the embodiment of the present invention.

FIG. 11 is a conceptual diagram showing the resource central control networking system architecture in which a first PC acts as the master main device and a second PC acts as a substitute master main device according to the embodiment of the present invention.

FIG. 11 shows that the second PC newly participates in the network shown in FIG. 9 as a slave main device.

Figure 12:
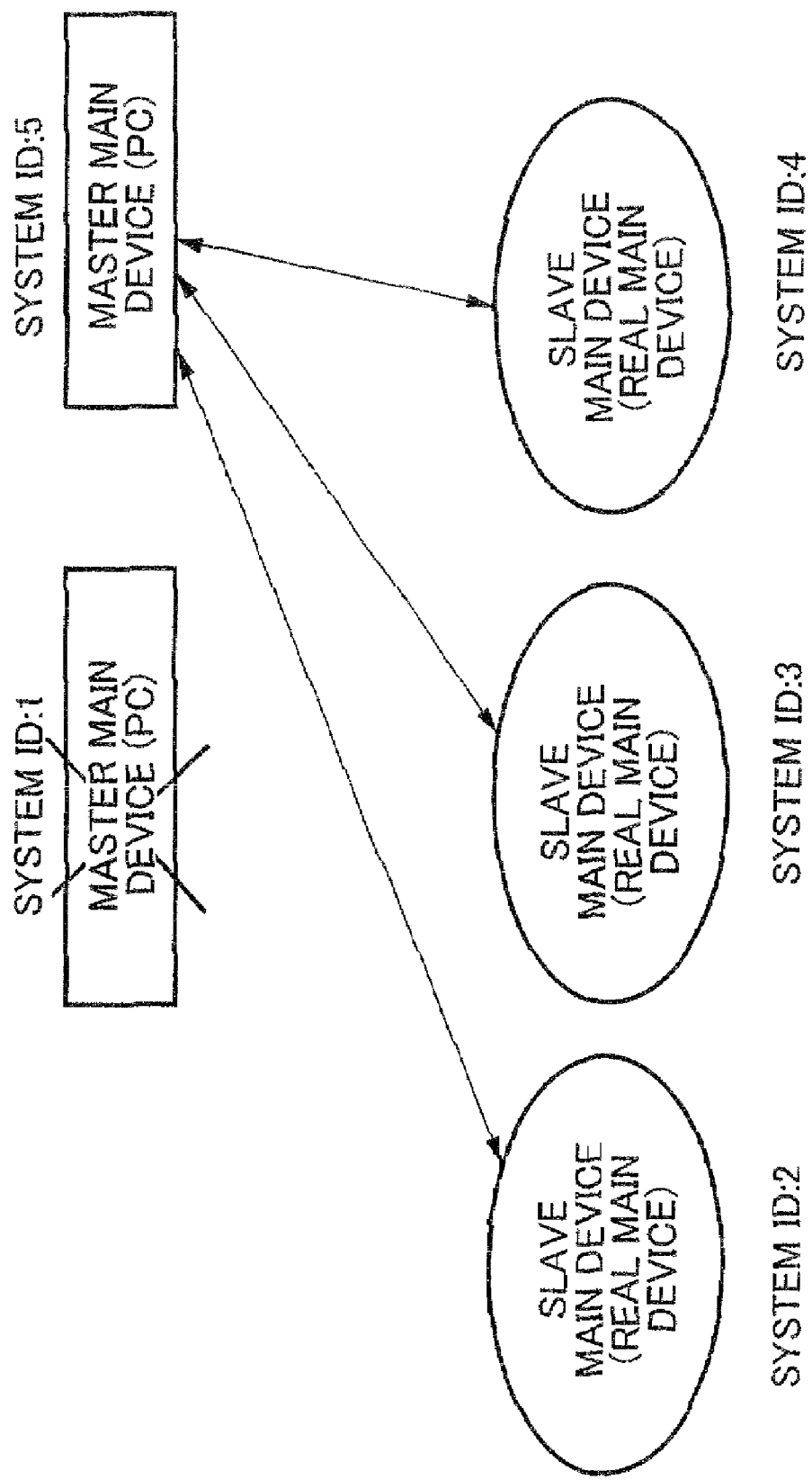
FIG. 12 is a conceptual diagram showing a connection relation among main devices if the first PC malfunctions according to the embodiment of the present invention.
Figure 13:
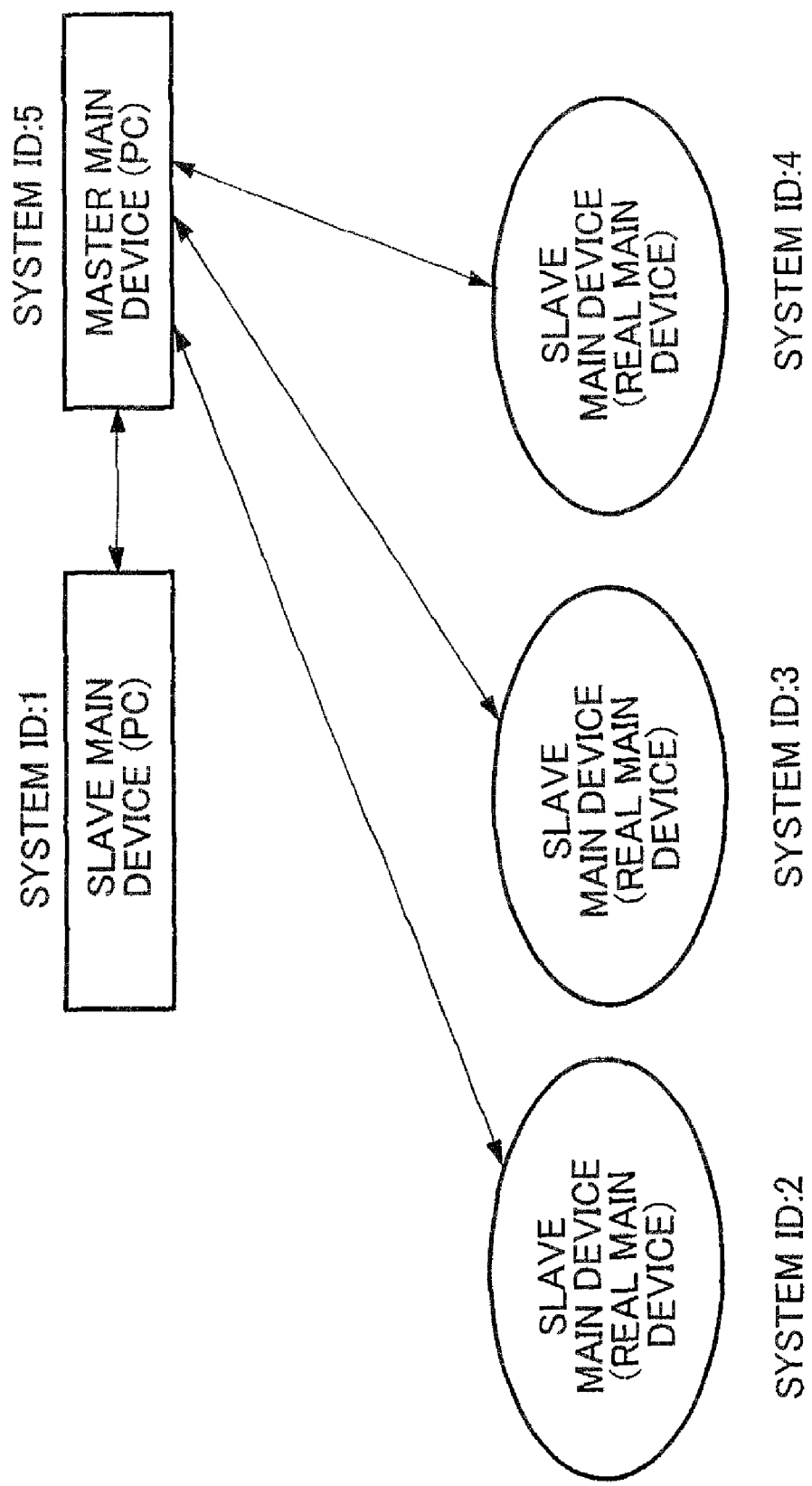
FIG. 13 is a conceptual diagram showing a connection relation among the main devices if the first PC is restored according to the embodiment of the present invention.

While the system 1 acting as the master main device operates normally, the PC identified by a system ID 5 (hereinafter, also "system 5") does not operate but is on standby. If a failure occurs to the system 1, the system 5 detects the occurrence of a failure and starts operating as the substitute master main device. By doing so, as shown in FIG. 12, even if a failure occurs to the PC acting as the master main device, the second PC having a similar CPU performance to that of the master main device can succeed to functions of the master main device. It is thereby possible to prevent deterioration in traffic processing capability. Furthermore, as shown in FIG. 13, if the system 1 returns from the failure, the system 1 is connected to the system 5 as a slave main device and put on standby in case of a failure. If a failure occurs to the system 5, the system 1 is allowed to start operating again as the master main device.

By so configuring, as long as one of the PCs operates, the active device acts as the master main device and the network can continue to operate.

The systems 2, 3, and 4 are real main devices including slots into which packages are installed, and accommodate therein packages connected to terminals, a public line, and an IP network, respectively. The systems 2, 3, and 4, which operate as the slave main devices, respectively, are connected to the first PC or the system 1 acting as the master main device by the IP, and are controlled by the system 1.

The first PC or the system 1 acting as the master main device integrally manages information such as hardware information and call states of the packages accommodated in the systems 2, 3, and 4, and exercises call control over all the systems 2, 3, and 4 (slave main devices) connected to the first PC.

The system 5, which is connected to the system 1 as the slave main device, monitors the system 1 and is put on standby in case of a failure.

A specific method of realizing the resource central control networking system architecture according to the embodiment will be described.

A method related to package resource management is the same as that described in the reference embodiment.

A method of using the PC as the master main device other than the package resource management-related method will be described.

Figure 14:
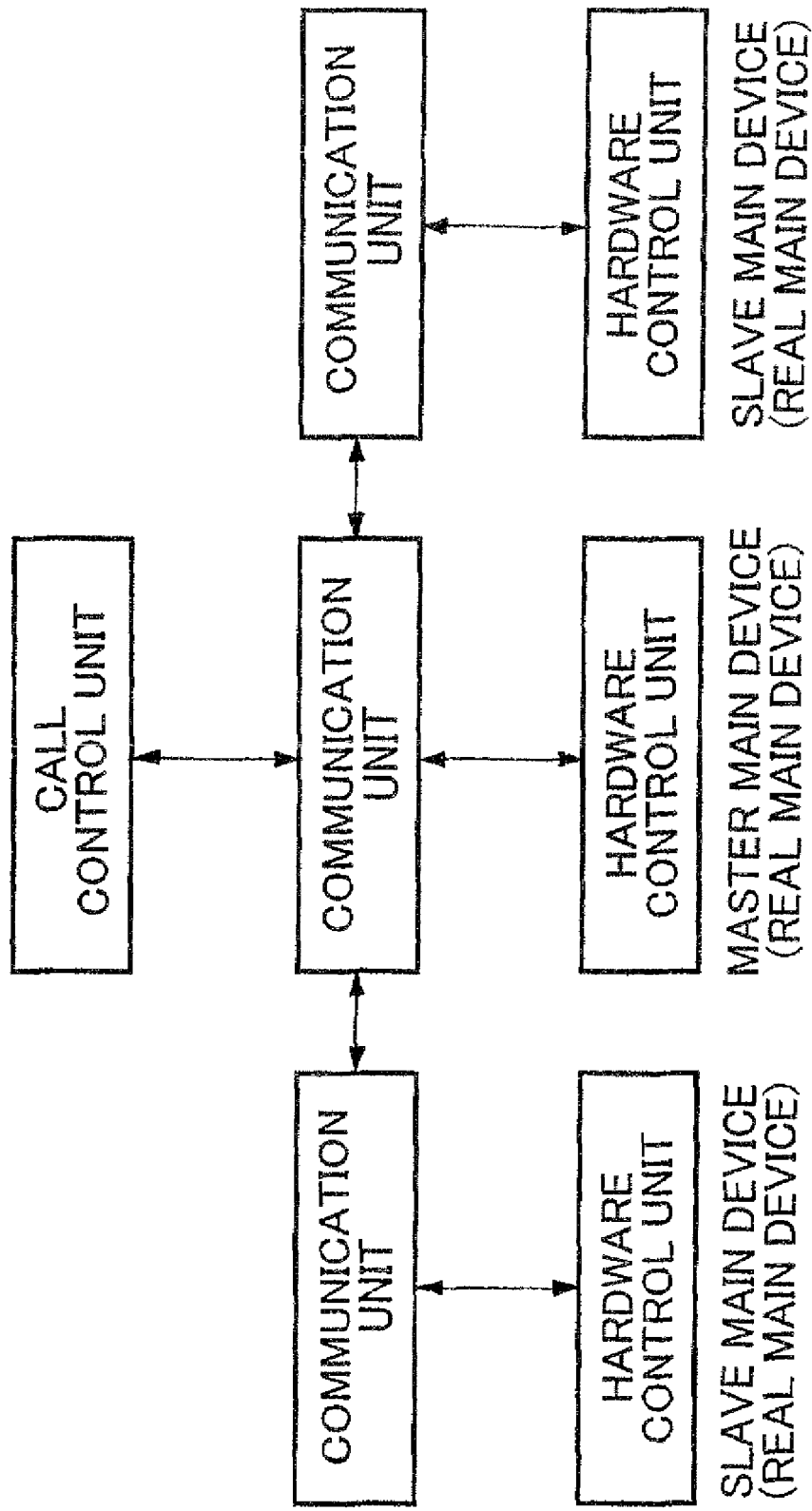
FIG. 14 is a conceptual diagram of a networking system architecture in which a real main device acts as a master main device according to a conventional technique.

FIG. 14 is a conceptual diagram of a networking system architecture in which a real main device acts as a master main device according to a conventional technique.

Functional modules of the networking system architecture are roughly classified into a call control unit controlling incoming calls and conversation, communication units each transmitting or receiving package data between the master main device and the slave main device, and hardware control units each receiving data from a package and transmitting a command to a package.

In FIG. 14, only the call control unit of the main device acting as the master main device operates whereas the slave main devise do not exercise call control.

In each of the slave main devices, the hardware control unit receives data from a package, and the communication unit transmits the data to the master main device.

In the master main device, the call control unit exerts call control based on the data transmitted from one of the slave main devices, and the communication unit transmits package data to the slave main device. The slave main device receives the package data and controls the hardware.

Furthermore, since the master main device includes slots accommodating therein packages, the hardware control unit operates to control packages.

Figure 15:
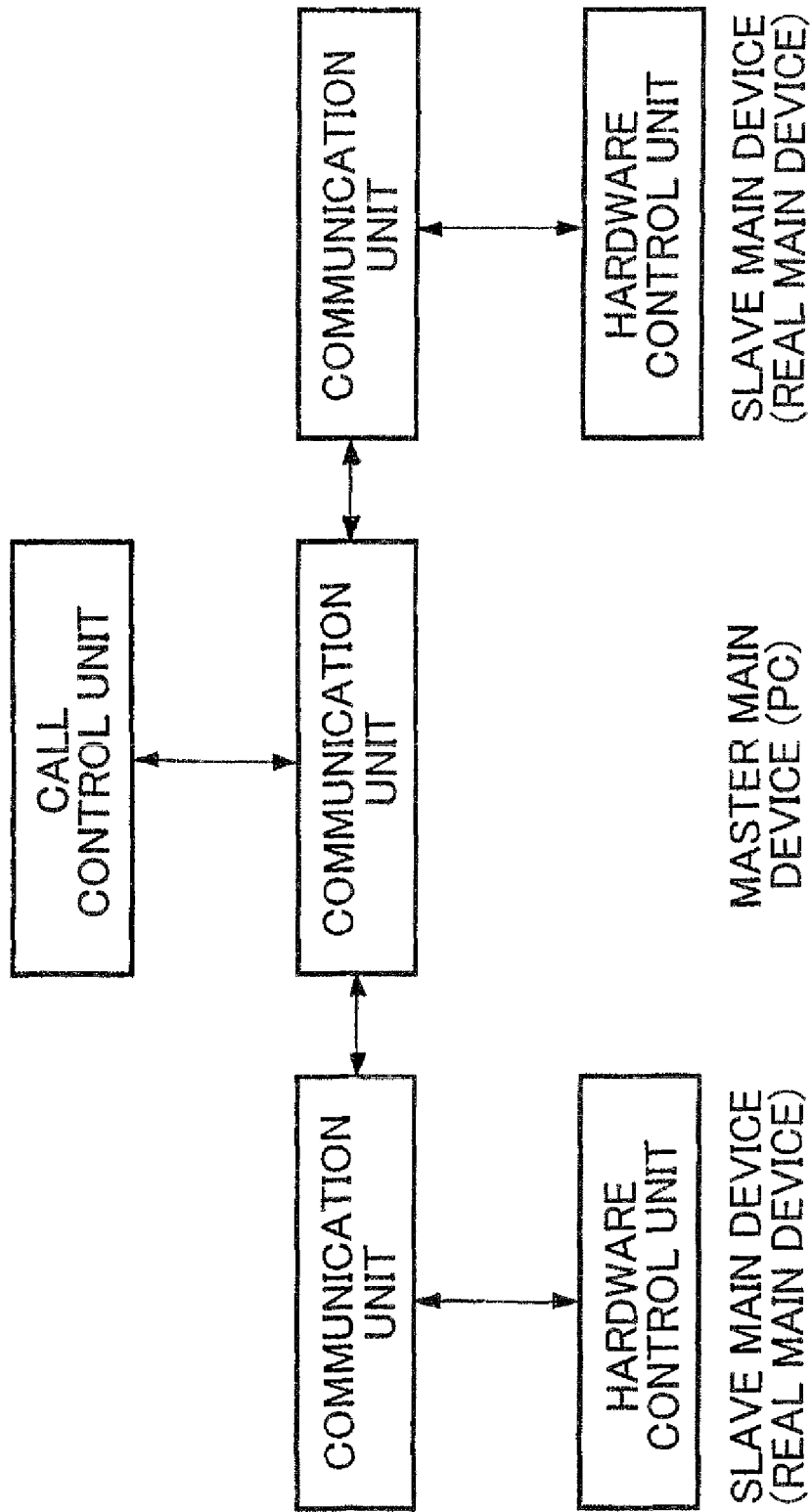
FIG. 15 is a conceptual diagram of a networking system architecture if the PC acts as the master main device.

FIG. 15 is a conceptual diagram of functional modules according to the embodiment of the present invention.

Since the master main device is the general-purpose PC, the master main device is naturally incapable of directly accommodating therein packages. Therefore, there is no need to provide a hardware control unit in the master main device.

Moreover, if the hardware control unit is present, the unit intends to control hardware that is not actually present. Due to this, it is necessary to prohibit the hardware control unit from operating.

Accordingly, only a call control unit and a communication unit are modules to be mounted in the master main device as shown in FIG. 15. It is, therefore, possible to mount the call control unit and the communication unit in the PC without depending on a processing target.

Moreover, communication between the master main device and each of the slave main devices is held using TCP/IP. Due to this, as long as the master main device and the slave main devices are equivalent in processing, it is unnecessary that the same OS is used between the master main device and each of the slave main devices. For example, a built-in OS such as Linux (registered trademark) can be mounted in the PC whereas a built-in OS such as VxWorks (registered trademark) or Nucleus Plus can be mounted in each real main device.

As shown in FIG. 15, in each of the main devices acting as the slave main devices, only the communication unit and the hardware control unit basically operate.

Due to this, it is necessary to mount a high performance CPU in the PC acting as the master main device. However, it suffices that an inexpensive CPU is mounted in each of the main devices acting as the slave main devices. Likewise, since the management of all the resources concentrates on the master main device, the PC acting as the master main device needs many memory resources. However, since each of the main devices acting as the slave main devices does not at all manage resources, it can operate with far fewer memory resources.

The resource central control networking system architecture includes the function of selecting one slave main device having the highest master main device priority set in advance as a substitute master main device from among the slave main devices so as to continue network operation if the master main device goes down. To prevent the real main device including only a low performance CPU and a small capacity memory from being selected as the substitute master main device, it is necessary to give low master main device priorities to the real main devices and give a highest master main device priority to the second or backup PC.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A slot interface access device in a networked computer system of a plurality of networked computer systems comprising:
    a slot management module;
    a slot control module; and
    a physical slot to management slot contrast table,
    wherein the slot management module, the slot control module, and the physical slot to management slot contrast table are provided between an input and output control module and a slot interface architecturally lower than the input and output control module, the input and output control module being a layer below an application layer of the slot interface access device,
    the input and output control module accesses the slot interface using virtual slot identification information,
    the slot management module converts the virtual slot identification information into physical slot identification information while referring to the physical slot to management slot contrast table, and accesses the slot control module corresponding to the physical slot identification information, thereby realizing a physical access of the input and output control module to the slot interface, and
    the slot interface access device is executed in the networked computer system of the plurality of networked computer systems with a higher CPU capability than other computer systems of the plurality of networked computer systems each including the slot interface.

2. The slot interface access device according to claim 1, wherein the slot interface access device does not comprise the slot interface.

3. A slot interface access device assembly comprising:
    the slot interface access device according to claim 1; and
    a slot interface access device acting as a substitute for the slot interface access device according to claim 1 if the slot interface access device according to claim 1 malfunctions, and having a higher CPU capability than CPU capabilities of the other devices.

4. A slot interface access method for a networked computer system of a plurality of networked computer systems including a slot management module; a slot control module; and a physical slot to management slot contrast table, the slot management module, the slot control module, and the physical slot to management slot contrast table being provided between an input and output control module and a slot interface architecturally lower than the input and output control module, the slot interface access method comprising:
    causing the input and output control module to access the slot interface using virtual slot identification information; and
    causing the slot management module to convert the virtual slot identification information into physical slot identification information while referring to the physical slot to management slot contrast table, and to access the slot control module corresponding to the physical slot identification information, thereby realizing a physical access of the input and output control module to the slot interface,
    wherein the slot interface access method is executed by the networked computer system of a plurality of networked computer systems with a higher CPU capability than other networked computer systems of the plurality of networked computer systems each including the slot interface,
    wherein the input and output control module being a layer below an application layer of the slot interface access device.

5. The slot interface access method according to claim 4, wherein the device executing the slot interface access method does not include the slot interface.

6. A slot interface access method comprising:
    causing a device higher in the CPU capability than the other devices to act as a substitute for the device executing the slot interface access method according to claim 4 if the device executing the slot interface access method according to claim 4 malfunctions.

7. A computer-readable recording medium with a computer program recorded thereon, comprising codes that, when executed, cause a computer to act as a slot interface access device for a networked computer system of a plurality of networked computer systems comprising:
- a slot management module;
- a slot control module; and
- a physical slot to management slot contrast table,
- wherein the slot management module, the slot control module, and the physical slot to management slot contrast table are provided between an input and output control module and a slot interface architecturally lower than the input and output control module,
- the input and output control module accesses the slot interface using virtual slot identification information,
- the slot management module converts the virtual slot identification information into physical slot identification information while referring to the physical slot to management slot contrast table, and accesses the slot control module corresponding to the physical slot identification information, thereby realizing a physical access of the input and output control module to the slot interface, and
- the slot interface access device is execute by the networked computer system of the plurality of networked computer systems with a higher CPU capability than other networked computer systems of the plurality of networked computer systems each including the slot interface,
- wherein the input and output control module being a layer below an application layer of the slot interface access device.

8. The computer-readable recording medium according to claim 7,
- wherein the slot interface access device does not comprise the slot interface.

* * * * *